(12) United States Patent
Shino

(10) Patent No.: US 10,569,421 B2
(45) Date of Patent: Feb. 25, 2020

(54) ROBOT APPARATUS, ROBOT CONTROL METHOD, METHOD FOR MANUFACTURING PART, AND RECORDING MEDIUM

(71) Applicant: CANON KABUSHIKI KAISHA, Tokyo (JP)

(72) Inventor: Kenji Shino, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 292 days.

(21) Appl. No.: 15/428,982

(22) Filed: Feb. 9, 2017

(65) Prior Publication Data

US 2017/0232616 A1    Aug. 17, 2017

(30) Foreign Application Priority Data

Feb. 12, 2016  (JP) .................................. 2016-025110

(51) Int. Cl.
*B25J 13/08*    (2006.01)
*B25J 19/06*    (2006.01)
*G01D 5/244*    (2006.01)

(52) U.S. Cl.
CPC ............ *B25J 13/088* (2013.01); *B25J 19/06* (2013.01); *G01D 5/24457* (2013.01); *B25J 13/08* (2013.01)

(58) Field of Classification Search
CPC . B25J 13/08; B25J 13/088; B25J 19/06; B25J 9/16; G01D 5/24457
See application file for complete search history.

(56) References Cited

U.S. PATENT DOCUMENTS

| 2005/0166413 A1* | 8/2005 | Crampton | B25J 13/088 33/503 |
| 2014/0084840 A1* | 3/2014 | Osaka | G05B 19/404 318/632 |
| 2014/0379128 A1* | 12/2014 | Ishikawa | B25J 9/1674 700/250 |
| 2016/0216137 A1* | 7/2016 | Horiguchi | B25J 17/00 |

FOREIGN PATENT DOCUMENTS

JP    2011-123716 A    6/2011

* cited by examiner

*Primary Examiner* — Rachid Bendidi
(74) *Attorney, Agent, or Firm* — Canon U.S.A., Inc. IP Division

(57) ABSTRACT

To improve production efficiency while maintaining stability of an operation of a robot arm. A dust position determination unit determines whether there is a read error based on a read result of a detection head of an encoder. In a case where the dust position determination unit determines that there is a read error, an error determination unit judges in which region, among an allowable region and a non-allowable region, the read error occurs. In a case where the read error is judged to occur in the allowable region, the error determination unit continues an operation of the robot arm.

14 Claims, 13 Drawing Sheets

ROBOT APPARATUS, ROBOT CONTROL METHOD, METHOD FOR MANUFACTURING PART, AND RECORDING MEDIUM

BACKGROUND OF THE INVENTION

Field of the Invention

The present invention relates to control of a robot arm including an encoder.

Description of the Related Art

Robots having an articulated robot arm and an end effector provided at an end of the robot arm are used in production lines for manufacturing products (parts). A joint mechanism of a robot arm includes a servo motor, such as an alternating-current (AC) servo motor and a direct-current (DC) brushless servo motor, and a reduction gear which is arranged on an output side of the servo motor to obtain high output torque. The servo motor and the reduction gear are connected to structural members, such as a link. An encoder (hereinafter, referred to as an "input encoder") is directly connected to an input side of the reduction gear, that is, a rotating shaft of the motor, to detect an angle. Position control on the end of the robot arm (the hand end of the robot) is performed based on the result of detection.

In the control using the input encoder, torsion or backlash of the reduction gear is not detected. A position error at the end of the robot arm is therefore occurs. Some driving systems use a timing belt between the motor and the reduction gear. Torsion and backlash ascribable to the timing belt can also cause a position error at the end of the robot arm. A change in the orientation of the robot arm and the weight of a workpiece can also cause a position error at the end of the robot arm.

Japanese Patent Application Laid-Open 2011-123716 discusses a configuration in which an encoder (hereinafter, referred to as an "output encoder") is arranged on an output side of the reduction gear, and a configuration in which encoders are arranged on both the input and output sides of the reduction gear. The use of the output encoder for position control on the end of the robot arm can reduce the position errors at the end of the robot arm.

There are two types of encoders: absolute encoders and incremental encoders. Both the encoders include a patterned scale and a detection head. The detection head moves relatively with respect to the scale and reads a position from the pattern of the scale.

If a defect, such as a scratch, is formed on the scale of an encoder or dust adheres to the scale, the detection head can be unable to detect an accurate detection position. In other words, a read error can occur.

Robots are mostly installed on a production line of a factory. If a robot is stopped because of a read error, the production of parts stops for the same period. To resume the production of parts after a stop of the robot, recovery operations, such as disassembling the robot arm and removing dust from the encoder or replacing the encoder, or replacing the robot arm, are needed.

If the robot arm is disassembled, new dust may enter the encoder depending on the cleanliness inside the factory. If the robot arm is replaced, re-teaching (setting of operation positions of the robot) is needed because of the presence of mounting errors and manufacturing variations of the robot arm. This means that a long time is required before recovery. In any case, when a read error occurs, robots are stopped. Since the production line needs to be frequently stopped for recovery operations, the production efficiency has been low.

SUMMARY OF THE INVENTION

The present invention is directed to improving the production efficiency while stability of an operation of a robot arm is maintained.

According to an aspect of the present invention, a robot apparatus includes a robot arm including an encoder, and a control unit configured to control an operation of a joint of the robot arm based on a detection result of the encoder, wherein the encoder includes a scale configured to include a region to be read on which a pattern is formed, and a detection head configured to move relatively with respect to the scale and read the pattern of the region to be read in the moved position, wherein the region to be read is divided between an allowable region in which a read error of the detection head is tolerated and a non-allowable region other than the allowable region, and wherein the control unit performs determination processing for determining presence or absence of the read error based on a read result of the detection head, judgment processing for, if the read error is determined to be present by the determination processing, judging in which region the read error occurs, the allowable region or the non-allowable region, and operation continuation processing for, if the read error is judged to occur in the allowable region by the judgment processing, continuing an operation of the robot arm.

According to the present invention, even if an operation of a robot arm continues when it is judged that a read error occurs in an allowable region of a scale, there is little effect on precision of the operation of the robot arm. The stability of the operation of the robot arm is thus maintained. Since the operation of the robot arm is continued, the production efficiency can be improved.

Further features of the present invention will become apparent from the following description of exemplary embodiments with reference to the attached drawings.

DESCRIPTION OF THE EMBODIMENTS

A mode for carrying out the present invention will be described in detail below with reference to the drawings.

Figure 1:
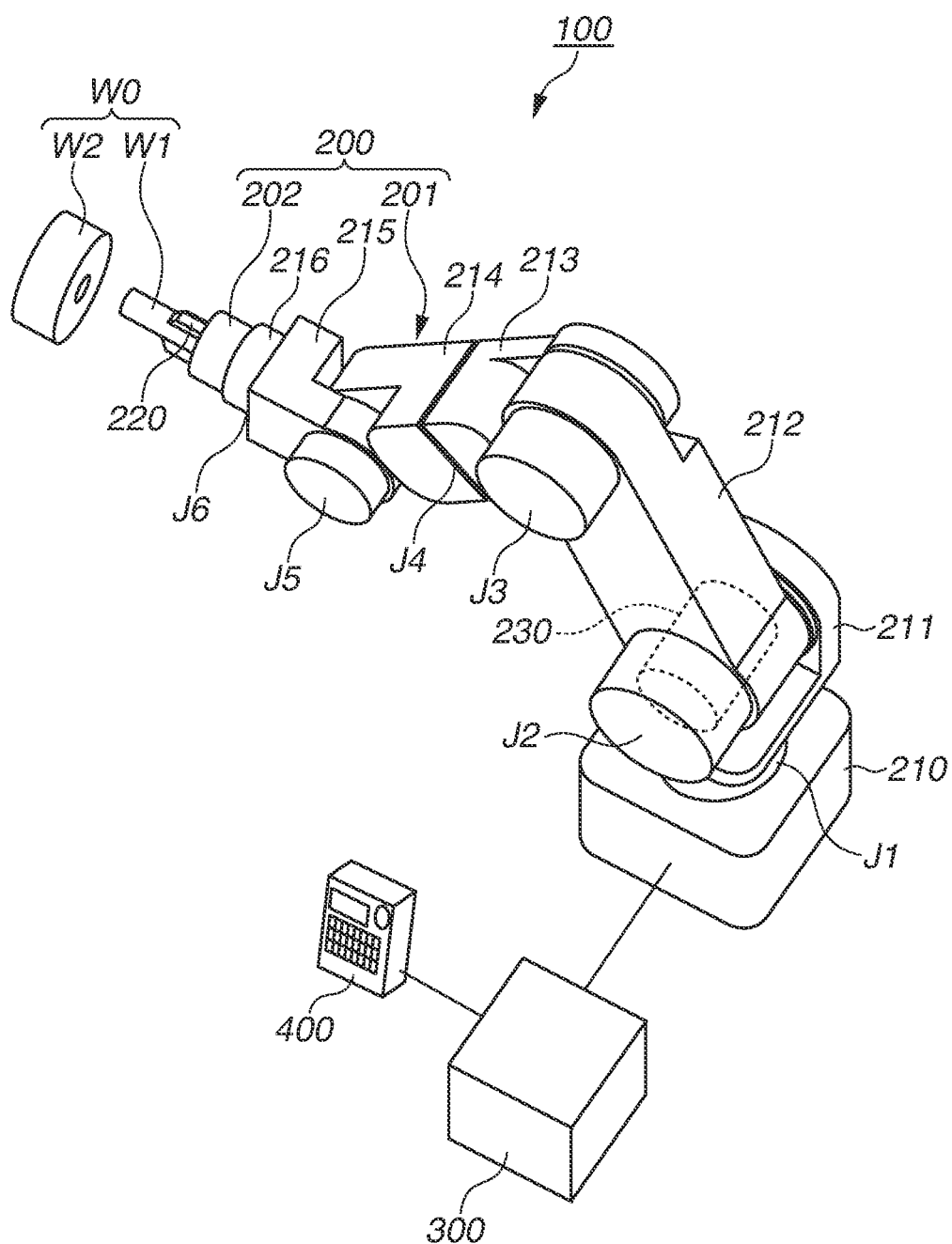
FIG. 1 is a perspective view illustrating a robot apparatus according to a first exemplary embodiment.

FIG. 1 is a perspective view illustrating a robot apparatus according to a first exemplary embodiment. A robot apparatus 100 includes a robot 200, a control apparatus 300, and a teaching pendant 400. The control apparatus 300 controls an operation of the robot 200. The teaching pendant 400 serves as a teaching unit which teaches the robot 200 how to operate according to a user's operations.

The robot 200 includes a robot arm 201, which is a vertical articulated robot arm, and a robot hand 202 serving as an end effector. The robot hand 202 is attached to an end of the robot arm 201.

The robot arm 201 includes a base unit (base link) 210 which is fixed to a pedestal, and a plurality of links 211 to 216 which transmits displacement and force. The robot arm 201 is constituted in such a manner that the links 210 to 216 are swingably (pivotably) or rotatably connected by joints J1 to J6. In the first exemplary embodiment, the robot arm 201 includes the joints J1 to J6 for six axes, including three swinging axes and three rotating axes.

The robot hand 202 includes a plurality of fingers 220. The robot hand 202 is attached to the link (end link) 216. The plurality of fingers 220 can be closed to grip a workpiece W1 which is a first workpiece. The plurality of fingers 220 can be opened to release the gripping of the workpiece W1. By gripping the workpiece W1 with the plurality of fingers 220, the robot arm 201 can perform an operation for assembling the workpiece W1, which is an assembling workpiece (first workpiece), to a workpiece W2, which is a workpiece to be assembled (second workpiece), to manufacture a part W0.

The robot arm 201 includes a plurality (six) of joint drive units 230. The joint drive units 230 are provided for the respective joints J1 to J6 and intended to drive the respective joints J1 to J6. For the sake of convenience, FIG. 1 illustrates only the joint drive unit 230 for the joint J2, and those for the other joints J1 and J3 to J6 are omitted in the diagram. The joint drive unit 230 having a similar configuration with the joint drive unit 230 for the joint J2 is arranged in each of the other joints J1 and J3 to J6.

Figure 2:
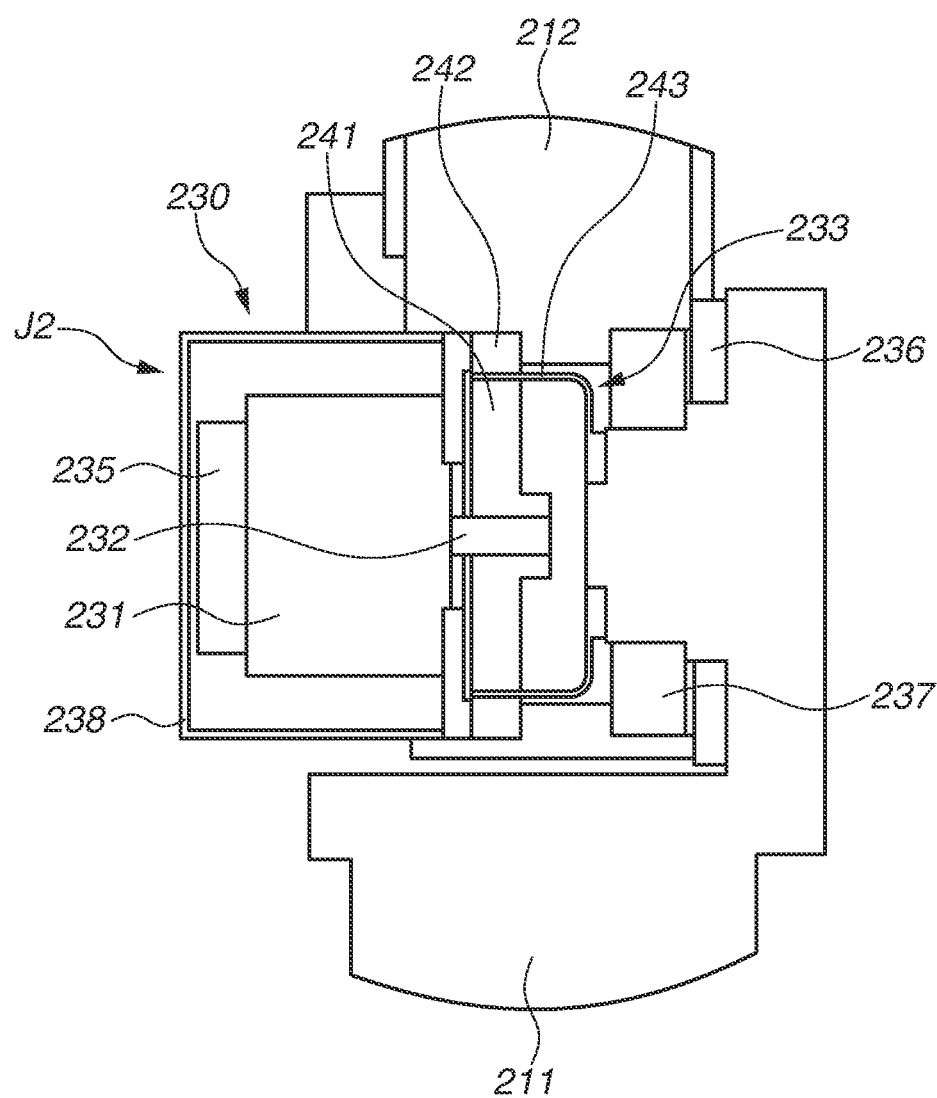
FIG. 2 is a partial cross-sectional view illustrating a joint of a robot arm of the robot apparatus according to the first exemplary embodiment.

FIG. 2 is a partial cross-sectional view illustrating the joint J2 of the robot arm 201. The joint J2 will hereinafter be described as a representative example. The other joints J1 and J3 to J6 have a similar configuration, and a description thereof will thus be omitted.

The joint drive unit 230 includes a rotation motor (hereinafter, referred to as a "motor") 231 and a reduction gear 233. The motor 231 serves as a drive source for driving the joint J2. The reduction gear 233 reduces the speed of output of the motor 231.

The motor 231 is a servo motor. Examples of the servo motor include a brushless DC servo motor and an AC servo motor. If a motor drive unit 365 to be described below applies pulse width modulation (PWM) signals to U-, V-, and W-phase windings of the motor 231, a rotor of the motor 231 rotates. The rotation of the motor 231 is decelerated through the reduction gear 233 and drives the joint J2 (link 212). Suppose, for example, that the joint J2 is a rotary joint and the reduction gear 233 has a reduction ratio of 50:1. In such a case, 50 rotations of the motor 231 produce one rotation of the link 212 arranged on the output side of the reduction gear 233.

The joint J2 includes an encoder (input encoder) 235 for detecting the position of the input side of the reduction gear 233, i.e., a rotation angle of a rotating shaft 232 of the motor 231. The joint J2 also includes an encoder (output encoder) 236 for detecting the position of the output side of the reduction gear 233, i.e., an angle that the link 212 forms to the link 211 (angle of the joint J2).

The encoder 235 is a rotary encoder and desirably an absolute encoder. The encoder 235 includes an absolute angle encoder for one rotation, a counter for the total number of rotations of the absolute angle encoder, and a backup battery which supplies power to the counter. With the backup battery in operation, the counter can retain the total number of rotations even when the power supply to the robot arm 201 is turned off, i.e., regardless of whether the power supply to the robot arm 201 is on or off. This enables orientation control of the robot arm 201. In the first exemplary embodiment, the encoder 235 is attached to the rotating shaft 232. Alternatively, the encoder 235 may be attached to an input shaft of the reduction gear 233.

The encoder 235 detects the rotation angle of the motor 231. For example, if the reduction gear 233 has a reduction ratio of 50:1, the encoder 235 needs to make 50 turns for one rotation of the link 212. From such a reason, an absolute encoder capable of detecting a rotation angle as large as 50 turns or more is used as the encoder 235.

The encoder 236 is a rotary encoder and is an absolute encoder. The encoder 236 detects a relative angle between the two adjoining links. In the joint J2, the encoder 236 detects the relative angle between the links 211 and 212. The encoder 236 may be attached to an output shaft of the reduction gear 233.

The links 211 and 212 are rotatably coupled via a cross roller bearing 237.

The motor 231 is covered with and protected by a motor cover 238. A not-illustrated brake unit is arranged between the motor 231 and the encoder 235. One of the main functions of the brake unit is to maintain the orientation of the robot arm 201 during power-off.

In the first exemplary embodiment, the reduction gear 233 is a wave reduction gear which has a small size, light weight, and a high reduction ratio. The reduction gear 233 includes a wave generator 241 serving as the input shaft and a circular spline 242 serving as the output shaft. The wave generator 241 is coupled to the rotating shaft 232 of the motor 231. The circular spline 242 is fixed to the link 212. In the first exemplary embodiment, the circular spline 242 is directly coupled to the link 212.

Alternatively, the circular spline 242 may be integrally formed on the link 212.

The reduction gear 233 also includes a flexspline 243. The flexspline 243 is arranged between the wave generator 241 and the circular spline 242, and fixed to the link 211. The flexspline 243 rotates relatively with respect to the circular spline 242 at a speed reduced by a reduction ratio of N to the rotation of the wave generator 241. The rotation of the motor 231 is thus decelerated by the reduction gear 233 at a reduction ratio of 1/N. The link 212 to which the circular spline 242 is fixed is thus relatively rotated with respect to the link 211 to which the flexspline 243 is fixed, whereby the joint J2 is swung (pivoted).

In the present exemplary embodiment, the rotating shaft 232 of the motor 231 is directly connected to the wave generator 241 which is the input shaft of the reduction gear 233. However, a transmission mechanism, such as a belt mechanism including a timing belt, may be arranged on the rotating shaft 232 of the motor 231. In such a case, the reduction gear 233 may be configured to include the transmission mechanism.

Figure 3:
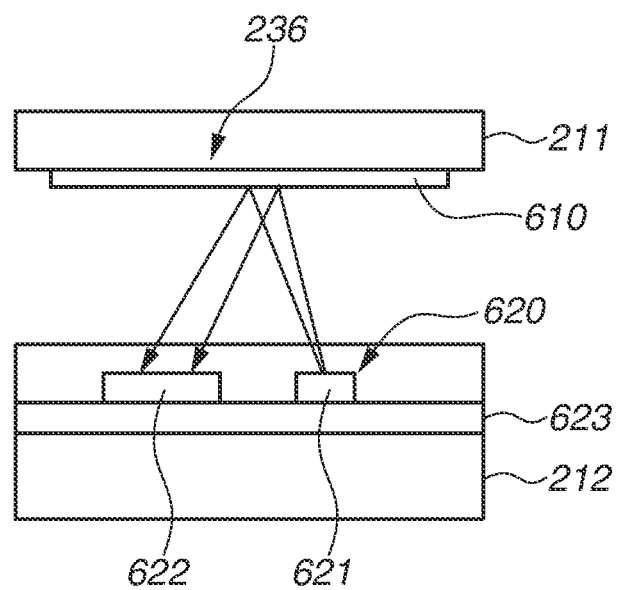
FIG. 3 is an explanatory diagram illustrating an output encoder of the robot apparatus according to the first exemplary embodiment.

FIG. 3 is an explanatory diagram illustrating a schematic configuration of the output encoder. The output encoder, which is the encoder 236, is an optical encoder. The encoder 236 includes a scale 610 and a detection head 620. The scale 610 is arranged on the link 211. The detection head 620 is arranged on the link 212. The arrangement of the scale 610 and the detection head 620 may be reversed. In other words, the scale 610 is arranged on either one of a pair of links connected by a joint, and the detection head 620 is arranged on the other.

The detection head 620 includes a light emitting element 621, a light receiving element 622, and a printed circuit board 623. The light emitting element 621 is a light source for irradiating the scale 610 with light. The light receiving element 622 is a light receiving unit for receiving reflected light from the scale 610. The light emitting element 621 and the light receiving element 622 are mounted on the printed circuit board 623. The light emitting element 621 is a light-emitting diode. The light receiving element 622 is a photodiode array.

The scale 610 includes a disc-shaped glass substrate on which a patterned reflection film is formed. The substrate of the scale 610 is not limited to glass, and resin may be used.

The light emitting element 621 is driven by a constant current circuit and is controlled to provide stable light output. A light beam from the light emitting element 621 travels toward the scale 610. The light beam is reflected from positions where the reflection film is formed on the scale 610, and not reflected from positions where the reflection film is not formed. The reflected light from the positions where the reflection film is formed on the scale 610 is received by the light receiving element 622.

An output (pulse signal) of the light receiving element 622 is amplified by an amplification circuit, and converted into a digital signal (serial signal) which exhibits a high level voltage if there is the reflection film and a low level signal if there is no reflection film. A parallel transmission system may be employed instead of the serial transmission system.

Figure 4:
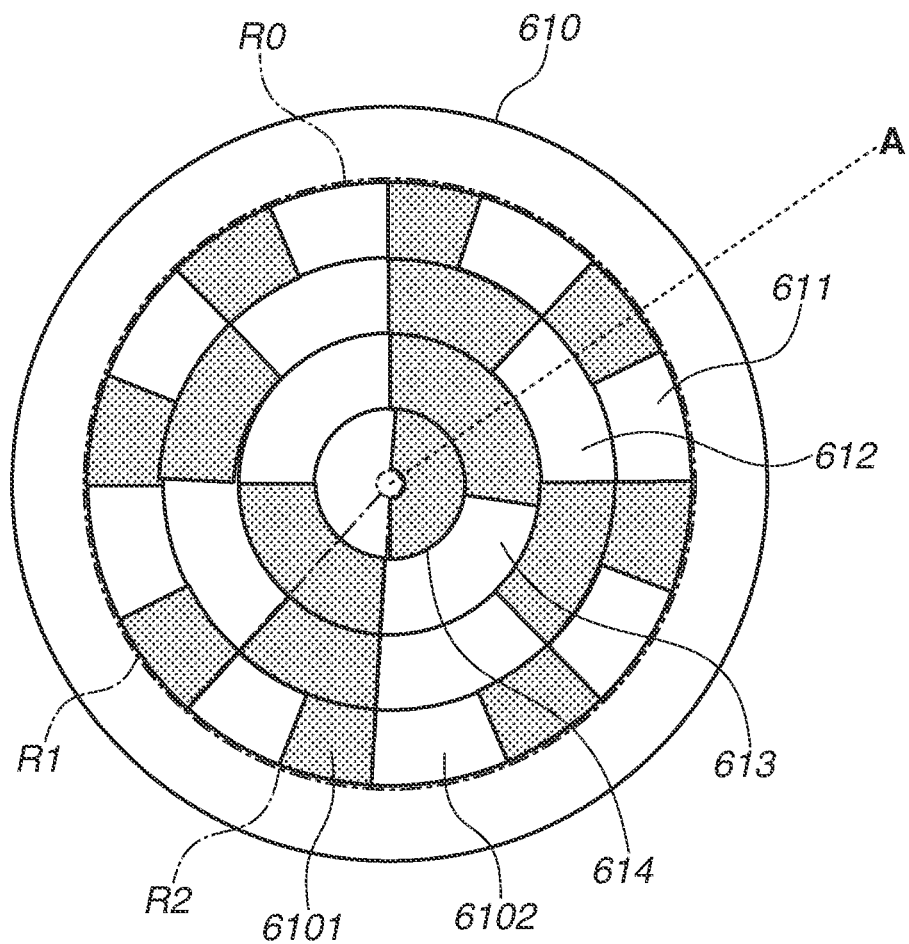
FIG. 4 is a plan view illustrating a scale of the output encoder according to the first exemplary embodiment.

FIG. 4 is a plan view illustrating the scale 610 of the output encoder according to the first exemplary embodiment. The output encoder which is the encoder 236 is an absolute encoder. The encoder 236 includes the scale 610 illustrated in FIG. 4.

The scale 610 includes a region to be read R0 which is illustrated by a dashed-dotted line in FIG. 4. The region to be read R0 includes a plurality of tracks 611 to 614 formed radially next to each other on the surface of the disc-shaped glass substrate. Portions 6101 having the reflection film and portions 6102 not having reflection film form a pattern on the region to be read R0. Specifically, the tracks 611 to 614 form a zebra pattern in which portions 6101 having the reflection film and portions 6102 not having the reflection film are alternately arranged in the circumferential direction (angle direction).

The detection head 620 (FIG. 3) moves relatively in the angle direction with respect to the scale 610 to read the radial pattern of the tracks 611 to 614 according to a position (angle) in the angle direction. The detection head 620 can thereby detect an absolute position (absolute angle) of the scale 610. The detection head 620 outputs a pulse signal representing a bit string corresponding to the tracks 611 to 614. Specifically, if the light receiving element 622 of the detection head 620 receives the reflected light, a pulse signal of high level is output. If the light receiving element 622 does not receive the reflected light, a pulse signal of low level is output. For example, in the position of the broken line A in FIG. 4, a pulse signal representing a bit string of 0 (low level) for the track 611, 1 (high level) for the track 612, 0 (low level) for the track 613, and 0 (low level) for the track 614 is output. Bit strings are defined to provide different code strings depending on 360° positions. Absolute position information is thus obtained from such bit strings.

In FIG. 4, an example of a simple binary code pattern is illustrated. However, the code string system is not limited thereto. Other code string systems, such as Gray code and M code, may be used.

The encoder 236 has been described above. The encoder 235 has substantially the same configuration as that of the encoder 236. A description thereof will thus be omitted.

Figure 5:
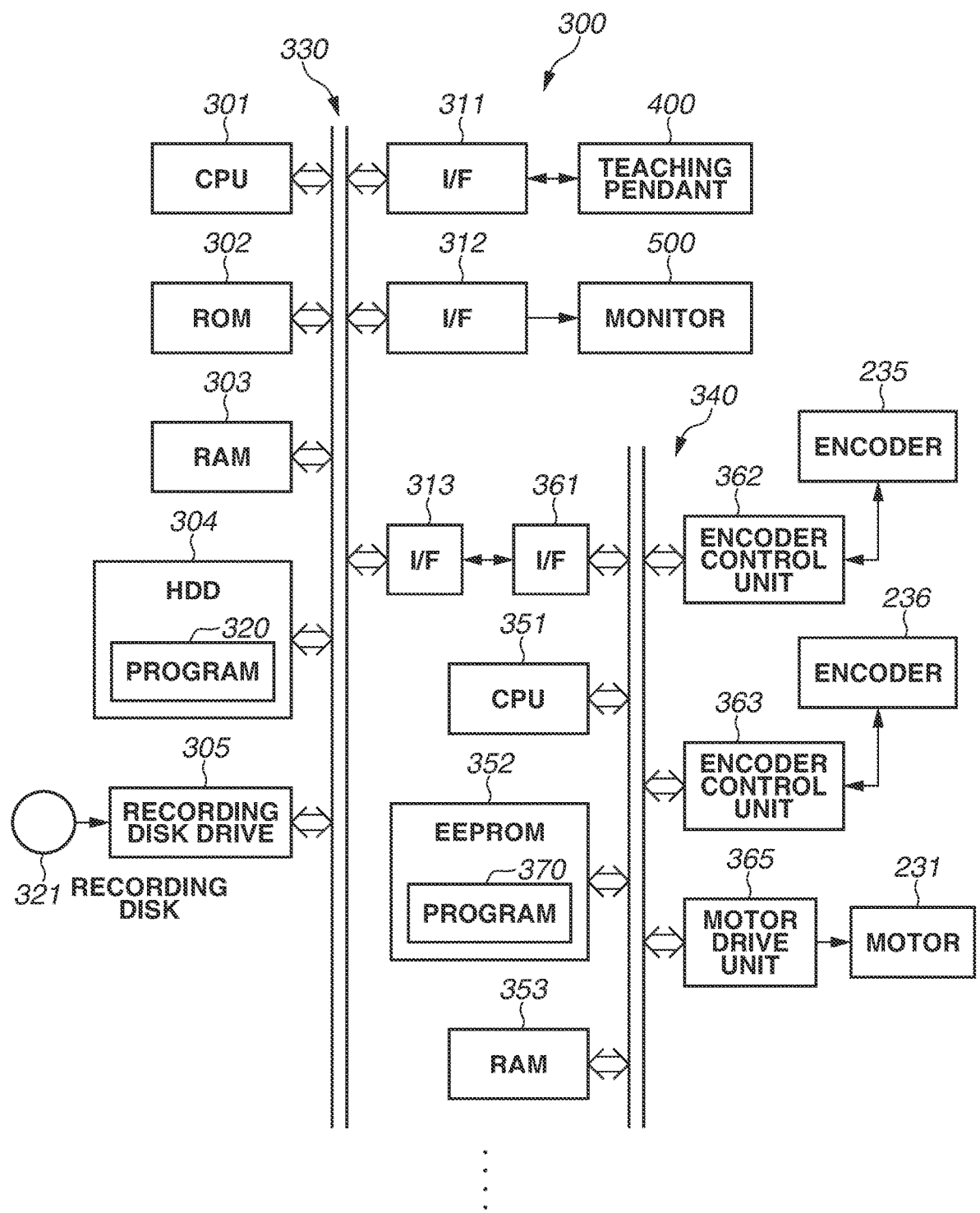
FIG. 5 is a block diagram illustrating a configuration of a control apparatus of the robot apparatus according to the first exemplary embodiment.

FIG. 5 is a block diagram illustrating a configuration of the control apparatus 300 of the robot apparatus 100. The control apparatus 300 includes a main control unit 330 and a plurality (as many as the number of joints; in the first exemplary embodiment, six) of joint control units 340.

The main control unit 330 is constituted by a computer, and includes a central processing unit (CPU) 301 serving as an arithmetic unit (control unit). The main control unit 330 includes a read-only memory (ROM) 302, a random access memory (RAM) 303, and a hard disk drive (HDD) 304 as storage units. The main control unit 330 also includes a recording disk drive 305 and various interfaces 311 to 313.

The CPU 301 is connected with the ROM 302, the RAM 303, the HDD 304, the recording disk drive 305, and the various interfaces 311 to 313 via a bus. The ROM 302 stores therein basic programs, such as a basic input/output system (BIOS). The RAM 303 is a storage device temporarily storing various types of data, such as an arithmetic processing result of the CPU 301.

The HDD 304 is a storage device storing arithmetic processing results of the CPU 301 and various types of data obtained from outside. A program 320 for causing the CPU 301 to perform processing to be described below is also recorded on the HDD 304. The CPU 301 performs the steps of a robot control method (method for manufacturing a part) based on the program 320 recorded on (stored in) the HDD 304.

The recording disk drive 305 can read various types of data and programs recorded on a recording disk 321. Not-illustrated external storage devices, such as a rewritable nonvolatile memory and an external HDD, may be connected to the main control unit 330.

The teaching pendant 400 serving as the teaching unit is connected to the interface 311. The teaching pendant 400 specifies teaching points for teaching the robot 200, or more specifically, target joint angles of the respective joints J1 to J6 (target rotation positions of the motors 231 of the joints J1 to J6) according to the user's input operations. The teaching pendant 400 outputs teaching point data to the HDD 304 via the interface 311 and the bus.

The HDD 304 stores the teaching point data including the joint angle data set by the user from the teaching pendant 400. The CPU 301 can read the teaching point data stored in the HDD 304. The CPU 301 calculates trajectory data on the joints J1 to J6 of the robot arm 201 from the teaching point data stored in the HDD 304. Specifically, the CPU 301 calculates the trajectory data by interpolating between the teaching points, using a specified interpolation method, such as linear interpolation and circular interpolation. The CPU 301 controls an operation of the joints J1 to J6 of the robot arm 201 according to the trajectory data.

A display device (monitor) 500 serving as a display unit is connected to the interface 312. The monitor 500 displays an image under the control of the CPU 301.

The joint control unit 340 is connected to the interface 313. In the first exemplary embodiment, the robot arm 201 includes six joints J1 to J6, and the control apparatus 300 includes six joint control units 340. In FIG. 5, only one of the joint control units 340 is illustrated, and the other five are omitted. The joint control units 340 are arranged inside the robot arm 201. However, the arrangement positions of the joint control units 340 are not limited thereto. For example, the joint control units 340 may be arranged inside a housing of the control apparatus 300.

Based on the teaching point data, the CPU 301 outputs drive command data to each joint control unit 340 via the bus and the interface 313 at predetermined time intervals. The drive instruction data indicates a control amount of the rotation angle of the rotating shaft 232 of the motor 231.

The joint control unit 340 includes a CPU 351, an electrically erasable programmable read-only memory (EEPROM) 352 and a RAM 353 serving as storage units, an interface 361, encoder control units 362 and 363, and a motor drive unit 365. These units are connected each other via a bus.

The CPU 351 performs arithmetic processing according to a program 370. The EEPROM 352 is a storage device storing the program 370. The RAM 353 is a storage device temporarily storing various types of data, such as an arithmetic processing result of the CPU 351.

The main control unit 330 includes a plurality (six) of interfaces 313 (only one of which is illustrated in FIG. 5). The interfaces 313 and the interfaces 361 of the respective joint control units 340 are connected by cables so that the main control unit 330 and the joint control units 340 can transmit and receive signals to/from each other.

The encoder 235 is connected to the encoder control unit 362. The encoder 236 is connected to the encoder control unit 363. The encoders 235 and 236 output pulse signals indicating detected angle detection values to the respective encoder control units 362 and 363.

The encoder control units 362 and 363 each include a constant current circuit which drives the light emitting element 621 of the detection head 620 described above, and an amplification circuit which amplifies and outputs the output of the encoder 235 or 236 as a digital signal (parallel signal).

An example of the motor drive unit 365 is a motor driver including a semiconductor switching element. The motor drive unit 365 outputs a pulse width-modulated three-phase AC voltage of PWM waveform to the motor 231, thereby supplying a current to the motor 231.

The CPUs 351 of the joint control units 340 output detection results of the encoders 235 and 236 to the CPU 301 of the main control unit 330. The CPU 301 outputs drive commands to the CPUs 351 of the respective joint control units 340 to control the operation of the joints J1 to J6 of the robot arm 201 based on the detection results of the encoders 235 and 236.

The CPU 351 of each joint control unit 340 calculates an output amount of the current (current command) to the motor 231 based on the drive command input from the CPU 301 of the main control unit 330, and outputs the current command to the motor drive unit 365.

The motor drive unit 365 supplies a current corresponding to the input current command to the motor 231. The motor 231 powered by the motor drive unit 265 generates and transmits drive torque to the wave generator 241 which is the input shaft of the reduction gear 233. In the reduction gear 233, the circular spline 242 serving as the output shaft rotates at the number of rotations 1/N to the rotation of the wave generator 241. As a result, the link 212 swings (rotates) relatively with respect to the link 211.

In such a manner, the joint control units 340 supply currents to the motors 231 to control joint angles of the respective joints J1 to J6 so that the joint angles moves closer to the joint angle commands (drive commands) input from the main control unit 330.

In the first exemplary embodiment, the computer-readable recording medium is described to be the HDD 304 and the EEPROM 352, and the programs 320 and 370 are described to be stored in the HDD 304 and the EEPROM 352. However, this is not restrictive. The programs 320 and 370 may be recorded on any recording medium that is computer-readable. For example, the recording disk 321 illustrated in FIG. 5 or other not-illustrated external storage devices may be used as the recording medium for supplying the programs 320 and 370. Specific examples of the recording medium may include a flexible disk, a hard disk, an optical disk, a magneto-optic disk, a compact disc read-only memory (CD-ROM), a compact disc recordable (CD-R), a magnetic tape, a nonvolatile memory, such as a Universal Serial Bus (USB) memory, and a ROM.

The CPU 301 selectively performs an input control mode (semi-closed loop control) and an output control mode (fully closed loop) as a control mode for controlling the operation of the robot arm 201. More specifically, the CPU 301 transmits commands to the CPUs 351 of the joint control units 340 to perform feedback control in the selected control mode.

The input control mode is a control mode in which the operations of the joints J1 to J6 of the robot arm 201 is controlled based on the detection results of the encoders 235 of the joints J1 to J6. Specifically, the feedback control is performed to bring the detection angles of the encoders 235 of the joints J1 to J6 close to the respective target angles. In the input control mode, the joint angle command which is the drive commands is corrected by the reduction ratio N of the reduction gear 233 (specifically, multiplied by N) and used as the target angles.

The output control mode is a control mode in which the operation of the joints J1 to J6 of the robot arm 201 is controlled based on the detection results of the encoders 236. Specifically, the feedback control is performed to bring the detection angles of the encoders 236 of the joints J1 to J6 close to the respective target angles.

The joints J1 to J6 each include flexible members, such as the reduction gear 233. The output control mode therefore provides high precision in terms of the position of the robot hand 202, compared with the input control mode. On the other hand, the input control mode provides higher responsiveness and is capable of high-speed operation of the robot arm 201.

Figure 6:
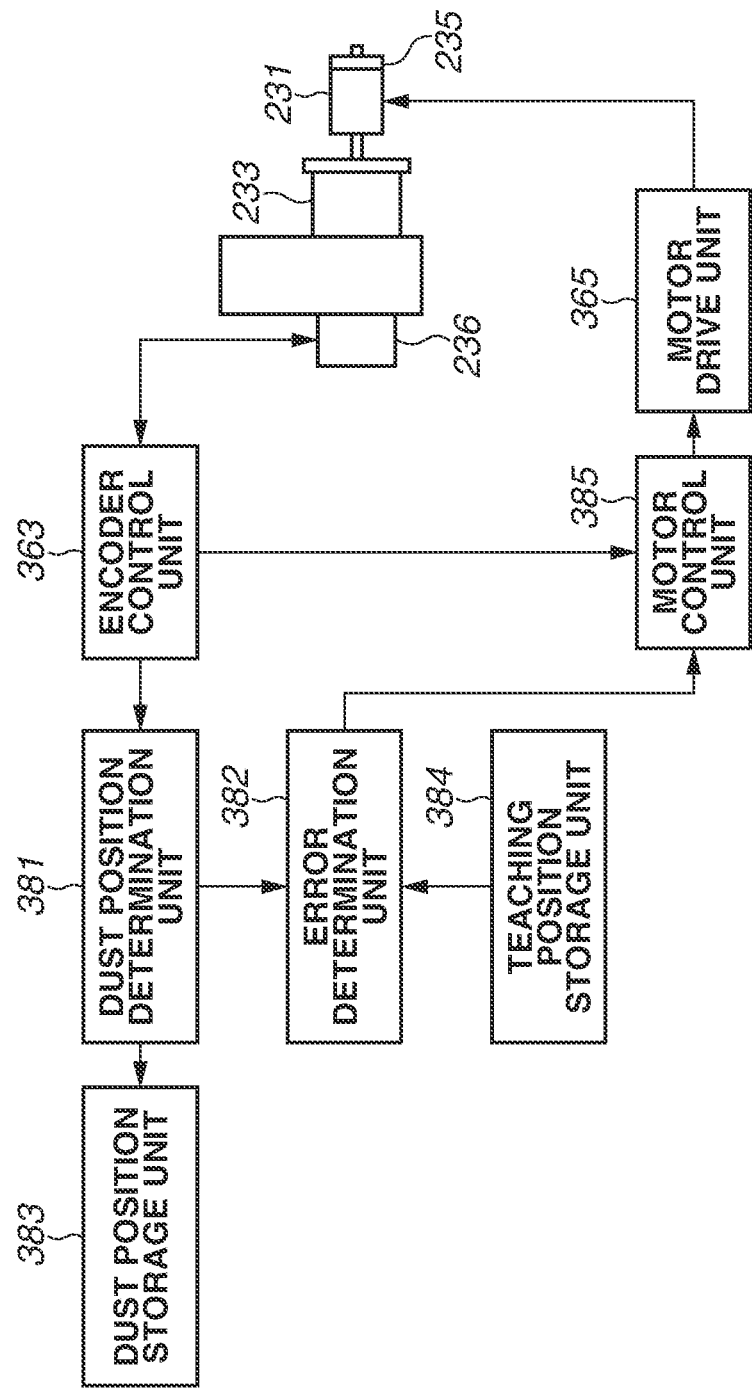
FIG. 6 is a functional block diagram illustrating a configuration of essential parts of the robot apparatus according to the first exemplary embodiment.

FIG. 6 is a functional block diagram illustrating a configuration of essential parts of the robot apparatus 100 according to the first exemplary embodiment. The control apparatus 300 is illustrated as blocks representing functions of the CPU 301 based on the program 320 and functions of the CPU 351 based on the program 370. FIG. 6 illustrates only one joint and one joint control unit 340 corresponding to the one joint.

The main control unit 330 includes a dust position determination unit 381, an error determination unit 382, a dust position storage unit 383, and a teaching position storage unit 384.

The CPU 301 of the main control unit 330 functions as the dust position determination unit 381 and the error determination unit 382 according to the program 320. The dust position storage unit 383 and the teaching position storage unit 384 are implemented by the HDD 304, for example.

The motor control unit 385 of each joint control unit 340 is a function of the CPU 351 operating according to the program 370. The motor control unit 385 is a feedback control unit for performing proportional-integral-differential (PID) control. The motor control unit 385 performs software control using a microcomputer (CPU 351).

In the present exemplary embodiment, the following method is used: the scale 610 is irradiated with the light from the light emitting element 621 and the reflected light is read. Since light reflection is used, if there is a scratch, defect, or dust on the optical path (specifically, on the scale 610), the reflected light is blocked and a read error occurs.

The joints J1 to J6 of the robot arm 201 are high in parts count and complicated in structure. Dust attached to various components can thus adhere to the scales 610 during assembly or during operation. Dust and oil mist occurring during operation can also adhere to the scales 610.

The encoders 235 serving as the input encoders are assembled with and sealed in the motors 231 in a clean room when the motors 231 are manufactured. Dust is therefore less likely to enter the encoders 235 afterward. If no read error occurs in the initial state, a read error is less likely to occur afterward. In contrast, the encoders 236 serving as the output encoders are assembled as a part of the joints J1 to J6 when the robot arm 201 is assembled.

Figure 7A:
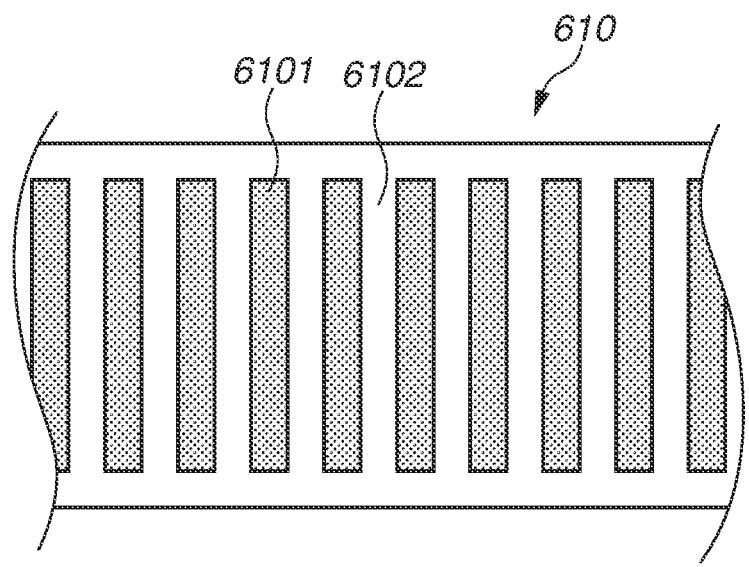
FIG. 7A is a schematic diagram, of a scale, illustrating a state in which there is no dust on the scale.
Figure 7B:
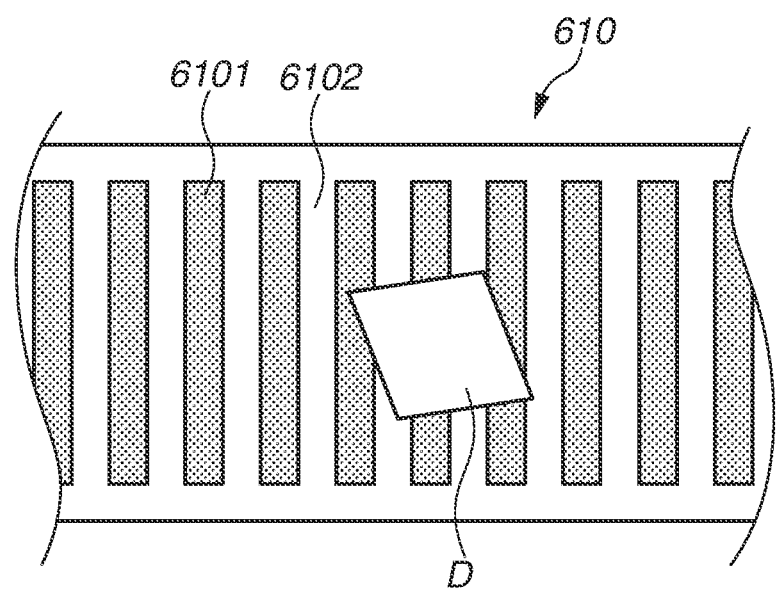
FIG. 7B is a schematic diagram, of the scale, illustrating a state in which there is dust adhering to the scale.

A read error will be specifically described. FIG. 7A is a schematic diagram of the scale 610 in a state in which there is no dust on the scale 610. FIG. 7B is a schematic diagram of the scale 610 in a state in which there is dust adhering to the scale 610. If a signal from the light receiving element 622 (an output signal of the encoder control unit 363) has a voltage level equal to or higher than a certain upper threshold, the signal is determined to be at a high level (i.e., 1). If the signal has a voltage level lower than a certain lower threshold, the signal is determined to be at a low level (i.e., 0). As illustrated in FIG. 7A, if there is no dust on the scale 610, the pattern of the scale 610 (portions 6101 with the reflection film and portions 6102 without the reflection film) can be accurately read.

As illustrated in FIG. 7B, if there is dust D on the scale 610, the voltage level of the signal becomes lower than the upper threshold and higher than the lower threshold. In other words, the presence of the dust D on the reflection film reduces the reflected amount of light (light beam received by the light receiving element 622, i.e., the received amount of light). The smaller the dust D in size, the smaller the amount of reduction of the light beam. The larger the dust D, the larger the amount of reduction of the light beam. The amount of reduction of the light beam also varies with the condition of the scratch, defect, or dust. For example, liquid and other dust particles have different effects. The positional accuracy decreases with the increasing size of the dust D. If the voltage level falls below the upper threshold (if the dust, scratch, or defect is large), a read error is determined to occur. If there is dust D in a position other than on the reflection film, the dust D increases the amount of reflection. The state in which whether the light beam received by the light receiving element 622 (output voltage level) is at a high level or low level is unable to be determined is determined to be a read error. In other words, in the present exemplary embodiment, a read error is determined using the voltage value as the amount of light received by the light receiving element 622.

The teaching points are set for throughout the operation of the robot arm 201. However, the effect of dust lying on the scale 610 of the encoder 236 varies between when the robot arm 201 moves and when the robot hand 202 grips the workpiece W1.

Suppose, for example, that a joint of the robot arm 201 is operated at a speed equivalent to 60 rpm. If the motor control is performed at periods of 500 µs, the encoder 236 obtains angular data at intervals of 10°. Since missing data can be interpolated, the effect of a scratch, defect, or dust on such a normal moving operation is small.

On the other hand, in the case of precisely teaching the robot hand 202 at pitches of several tens of micrometers, the robot hand 202 is not able to be adjusted to precise positions if the data of the encoder 236 is missing. A scratch, defect, or dust can therefore have a significant impact. The teaching for operating the robot arm 201 will hereinafter be referred to as "teaching". Teaching the robot arm 201 to position the robot hand 202 with a precision of several tens of micrometers will be referred to as "precision teaching".

A relationship between the size of dust and the use range of the encoder 236 will be described. For example, if the scale pitch is 100 µm, the reading of the encoder 236 starts to be affected at a dust size of 100 µm or more. At dust sizes of below 100 µm, the encoder 236 can detect a position but with low accuracy. Although it is depending on the scale size, if there is dust of 100 µm and the number of scale tracks is 2000, a range of 0.2° becomes unusable. In fact, the resolution of the encoder 236 with 2000 scale tracks is several hundred to several thousand times higher by virtue of technology for multiplying the read scale data.

Figure 8:
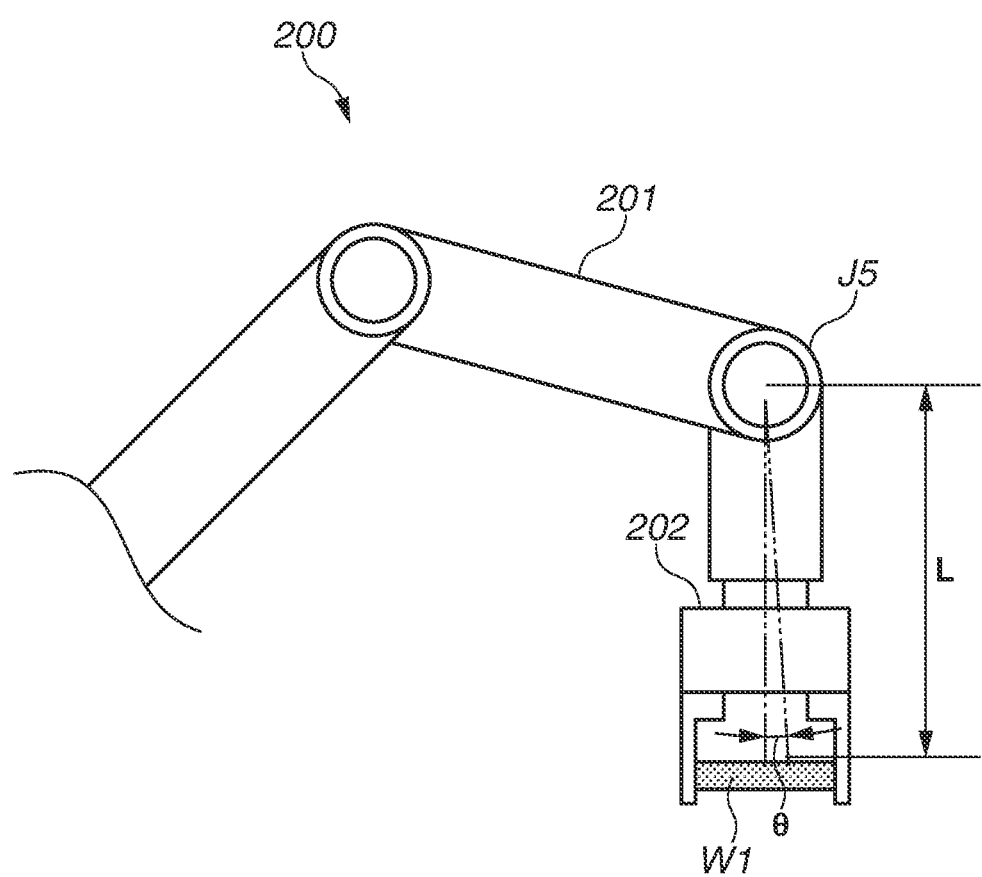
FIG. 8 is a diagram for describing an angle of an output encoder and a moving distance of a robot hand.

FIG. 8 is a diagram for describing the angle of the encoder 236 and the moving distance of the robot hand 202. Suppose that a distance L from the joint J5 of the robot arm 201 to the hand end of the robot 200 (robot hand 202) is 100 mm. The range of 0.2° in the angle θ of the hand end means that a range of 0.3 mm at the hand end becomes unusable. If the precision needed of the position of the hand end is several tens of micrometers, such a read error is not allowable. In precision teaching, the effect of dust or a defect is therefore not negligible.

The angular range of actual precision teaching and the angular range affected by dust will be compared. Precision teaching uses a range of several millimeters at the hand end portion of the robot 200. For example, suppose that the distance L from the joint J5 to the hand end is 100 mm. If precision teaching is performed across the range of 2 mm at the hand end of the robot 200, the used angle θ is approximately 1°. If there is dust covering the range of 0.2°, the probability for the position of the dust to coincide with that of the precision teaching is approximately 1/360. The dust or defect therefore does not necessarily affect the precision teaching.

In the precision teaching, the position and orientation of the robot hand 202 in X, Y, and Z directions are taught by operating the robot 200 with the teaching pendant 400. In the present exemplary embodiment, the teaching position storage unit 384 stores the commanded angle information about the joints J1 to J6 as teaching point data. The error determination unit 382 divides the region to be read R0 of each scale 610 between an allowable region R1 and a non-allowable region R2 based on the teaching point data of the teaching position storage unit 384. In the allowable region R1, a read error of the detection head 620 is tolerated. The non-allowable region R2 is an region other than the allowable region R1. The non-allowable region R2 is set to include a position corresponding to the teaching point data on the scale 610. The user may set the allowable region R1 and non-allowable region R2 in advance.

In the first exemplary embodiment, the effect of a read error from a scratch, defect, or dust on the operation of the robot arm 201 is determined from the positional relationship between a dust position on the scale 610 of the encoder 236 and the teaching points. Depending on the result of determination, operation continuation processing and operation stop processing are switched.

In the first exemplary embodiment, the process of manufacturing the part W0 includes positioning the robot arm 201 to teaching points taught by precision teaching. For example, the robot arm 201 is positioned to teaching points where an assembly start position and an assembly completion position are taught. During such positioning, the operation of the robot arm 201 is controlled in the output control mode. When the robot arm 201 moves between the teaching points, the operation of the robot arm 201 is controlled in the input control mode.

Figure 9:
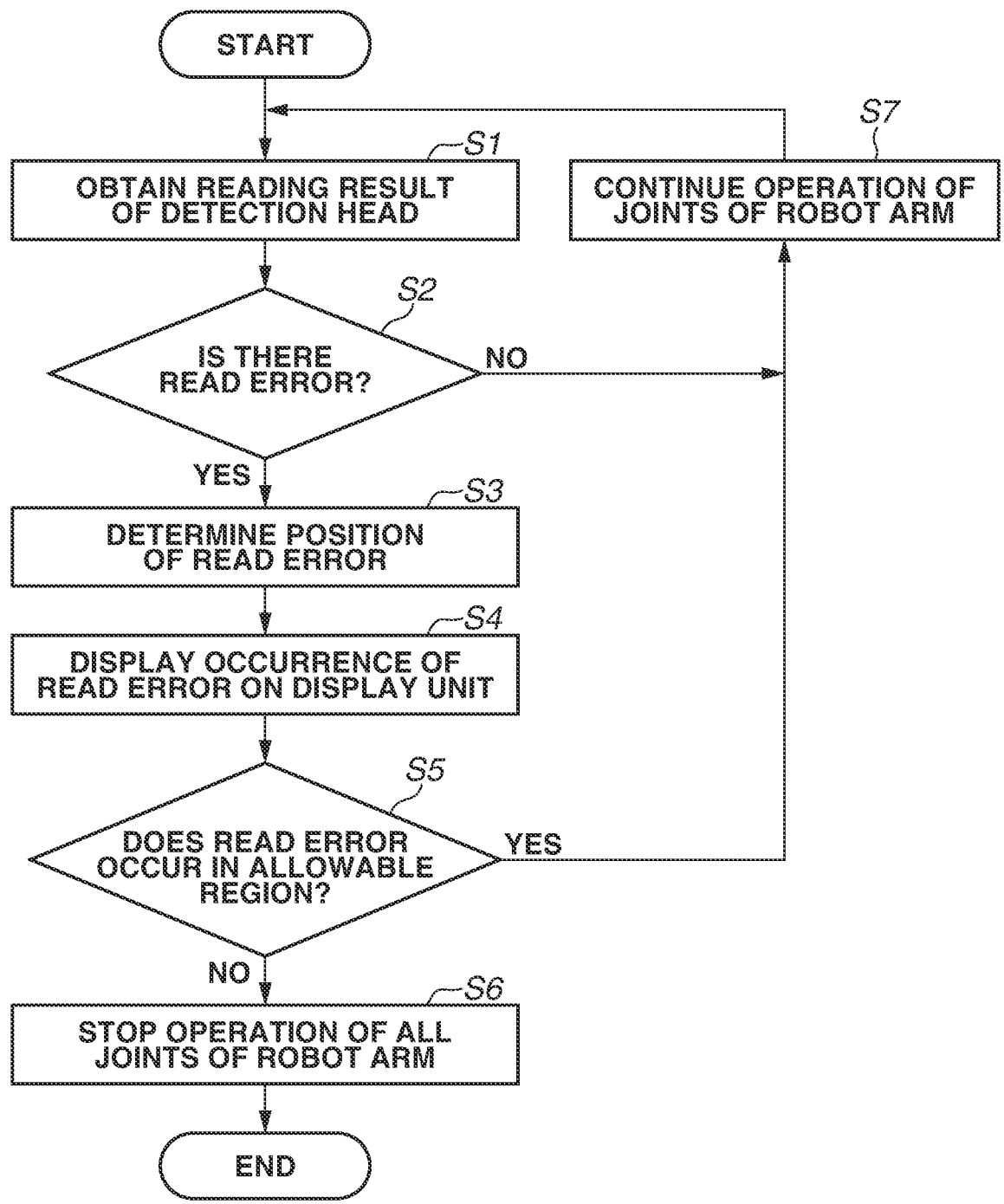
FIG. 9 is a flowchart illustrating a robot control method according to the first exemplary embodiment.

FIG. 9 is a flowchart illustrating a robot control method (method for manufacturing a part) according to the first exemplary embodiment. In step S1, the dust position determination unit 381 obtains a read result of the detection head 620 (light receiving element 622) from the encoder control unit 363.

In step S2, the dust position determination unit 381 determines whether there is a read error based on the read result of the detection head 620 (i.e., the amount of light received by the light receiving element 622) (determination processing; determination step).

In step S2, in a case where the dust position determination unit 381 determines that there is a read error (YES in step S2), the processing proceeds to step S3. In step S3, the dust position determination unit 381 determines the position of a scratch, defect, or dust on the scale 610 of the encoder 236. For example, the dust position determination unit 381 can calculate position information about the position of the scratch, defect, or dust from information (angle θA) about a readable position immediately before where the read error occurs from the scratch, defect, or dust, and information (angle θB) about a readable position immediately after where the read error occurs.

The position information about the scratch, defect, or dust is calculated by the following expression:

(θB−θA)/2+θB.

Since the encoder 236 is an absolute encoder, the encoder 236 can obtain the position information about the angle θB without once returning to its home position.

Suppose, for example, that the encoder 236 obtains 251.27° as an nth piece of angle information and 251.29° as an (n+1)th piece of angle information. Suppose also that a read error then occurs before the encoder 236 obtains 251.33° as an (n+2)th piece of angle information. In such a case, the position of the scratch, defect, or dust on the scale 610 is given by:

(251.33°−251.29°)/2+251.29°.

As a result, position information of 251.31° is obtained.

In step S3, the dust position determination unit 381 thus identifies the position where the read error occurs from the previous and subsequent positions where no read error occurs. The dust position determination unit 381 stores the position where the read error occurs on the scale 610 of the encoder 236 into the dust position storage unit 383.

In a case where, in step S2, the dust position determination unit 381 determines that there is a read error (YES in step S2), the processing then proceeds from step S3 to step S4. In step S4, the dust position determination unit 381 displays the occurrence of the read error on the monitor 500 which is the display unit. Here, the dust position determination unit 381 may display the position information, determined in step S3, about the position where the read error occurs. In the present exemplary embodiment, the notification unit is described to be the monitor 500. However, this is not restrictive. The occurrence of the read error may be notified of by a buzzer or sound.

In a case where, in step S2, the dust position determination unit 381 determines that there is a read error (YES in step S2), the processing then proceeds from step S4 to step S5. In step S5, the error determination unit 382 judges in which region, the allowable region R1 or the non-allowable region R2, the read error occurs (judgment processing; judgment step). For example, the error determination unit 382 judges whether the read error occurs in the allowable region R1. In the present exemplary embodiment, the error determination unit 382 judges in which region, the allowable region R1 or the non-allowable region R2, the read error occurs, based on the position of the read error identified in step S3.

In step S5, in a case where the error determination unit 382 judges that the read error occurs in the non-allowable region R2 (NO in step S5), the processing proceeds to step S6. In step S6, the error determination unit 382 stops the operation of all the joints J1 to J6 of the robot arm 201 (operation stop processing; operation stopping step).

In step S5, in a case where the error determination unit 382 judges that the read error occurs in the allowable region R1 (YES in step S5), the processing proceeds to step S7. In step S7, the operation of the joints J1 to J6 of the robot arm 201 is continued (operation continuation processing; operation continuation step). The processing then returns to step S1. In step S2, in a case where the dust position determination unit 381 determines that there is no read error (NO in step S2), the processing proceeds to step S7. In step S7, the operation of the joints J1 to J6 of the robot arm 201 is continued (operation continuation processing; operation continuation step). The processing then returns to step S1. When the operation is continued, the motor control unit 385 performs feedback control to control the driving of the motors 231 based on the position information from the encoder control units 363.

The probability for the position of dust to overlap with a position used by the encoder 236 for precision teaching (non-allowable region R2) is low. In the first exemplary embodiment, if a read error is judged to occur in the allowable region R1, the operation of the robot arm 201 is not immediately stopped but continued. Although a read error is judged to occur in the allowable region R1 of the scale 610 and the operation of the robot arm 201 is continued, the precision of the operation of the robot arm 201 is little affected. The stability of the operation of the robot arm 201 is thus maintained. Since the robot arm 201 continues operating, the frequency of stops of the robot arm 201 can be reduced. This increases the operation rate of the robot apparatus 100 and improves the production efficiency of the part W0.

If a read error occurs in the allowable region R1, the operation of the joints J1 to J6 of the robot arm 201 is continued, and the occurrence of the read error is displayed on the monitor 500 for warning processing. This enables anti-dust measures during maintenance.

In the first exemplary embodiment, the encoder 236 is described to be subjected to the determination. However, the encoder 235 may be subjected to the determination. Alternatively, both the encoders 235 and 236 may be subjected to the determination.

In the first exemplary embodiment, the robot arm 201 is described to include the encoders 235 and 236. However, the robot arm 201 may include either the encoders 235 or the encoders 236. In particular, the robot arm 201 may include only the encoders 236 which have a structure easy for dust to enter. In such a case, the encoders included in the robot arm 201 are subjected to the determination.

Figure 10:
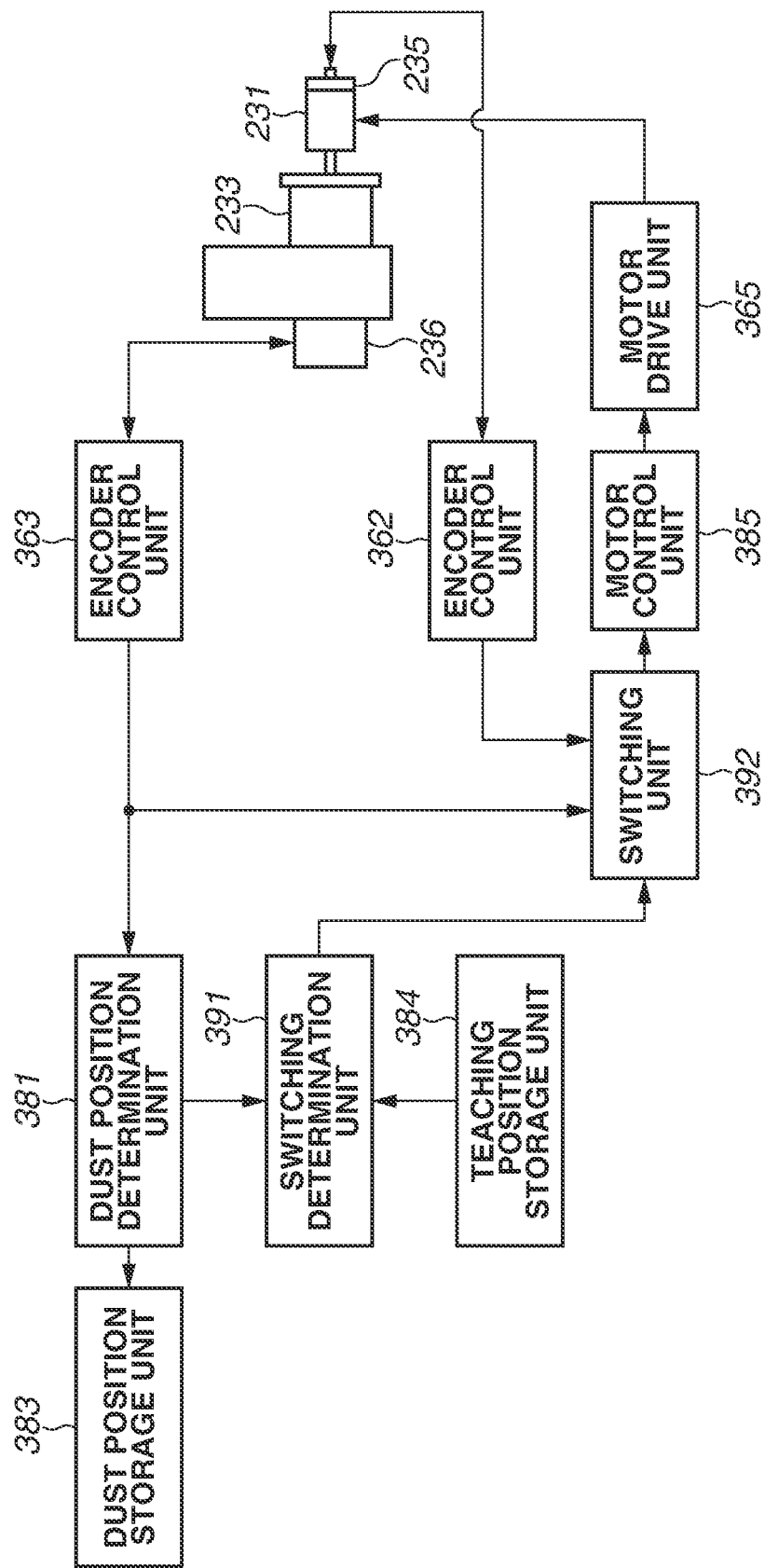
FIG. 10 is a functional block diagram illustrating a configuration of essential parts of a robot apparatus according to a second exemplary embodiment.
Figure 11:
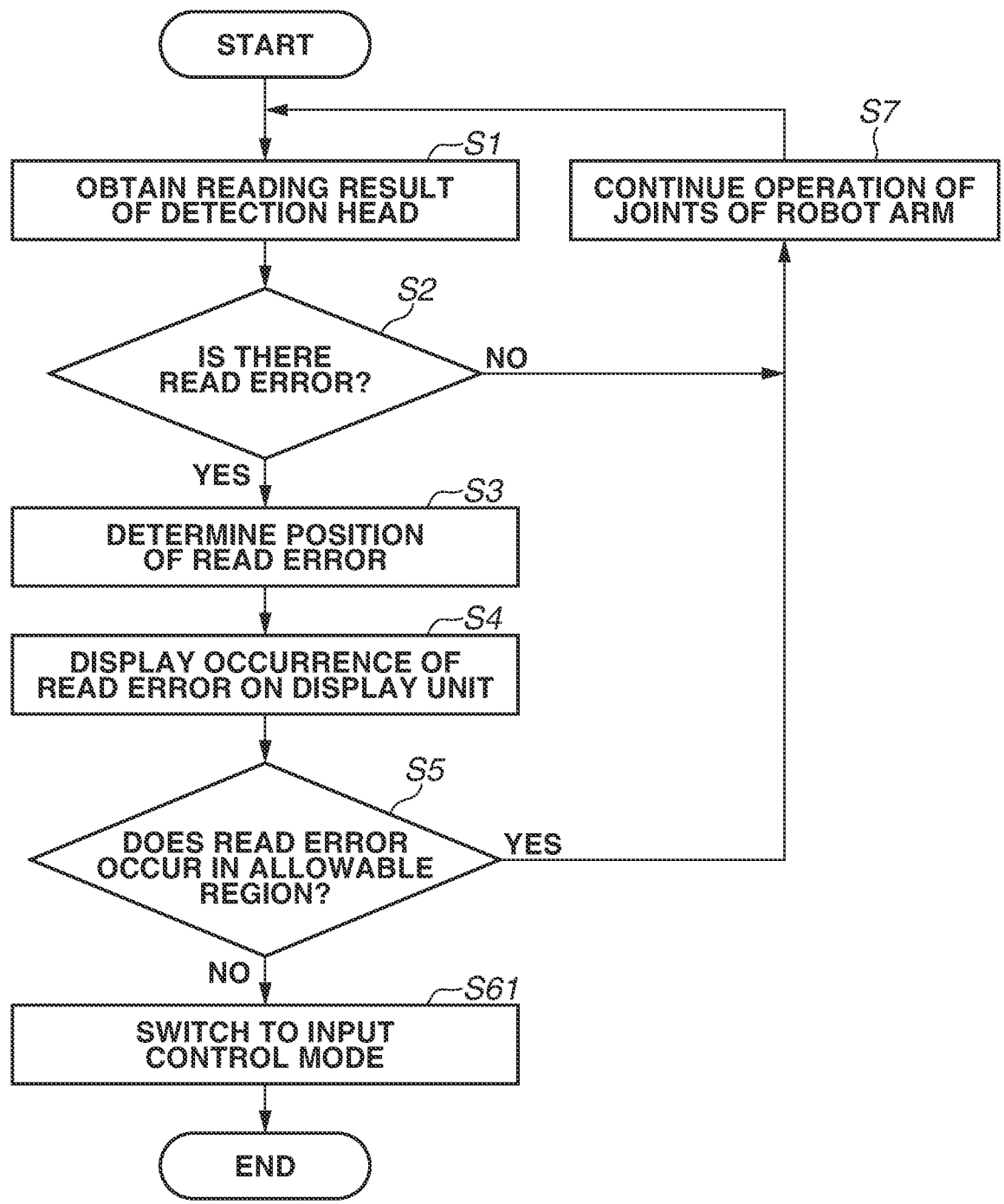
FIG. 11 is a flowchart illustrating a robot control method according to the second exemplary embodiment.

Next, a robot control method (method for manufacturing a part) of a robot apparatus according to a second exemplary embodiment will be described. FIG. 10 is a functional block diagram illustrating a configuration of essential parts of the robot apparatus according to the second exemplary embodiment. FIG. 11 is a flowchart illustrating the robot control method (method for manufacturing a part) according to the second exemplary embodiment. The robot apparatus according to the second exemplary embodiment has a configuration similar to that of the robot apparatus 100 described in the first exemplary embodiment. A difference lies in the functions of the control apparatus 300 (CPU 301), or more specifically, the programs 320 and 370. In the second exemplary embodiment, a description of the configuration and functions similar to those of the first exemplary embodiment will be omitted.

In the first exemplary embodiment, the operation of the robot arm 201 is stopped if a read error is judged to occur in the non-allowable region R2. In the second exemplary embodiment, switching from the output control mode to the input control mode is performed to control the operation of the robot arm 201. If high precision is not needed in precision teaching, the encoder 235 which is an input encoder may be used.

In the second exemplary embodiment, the main control unit 330 includes the dust position determination unit 381, a switching determination unit 391, the dust position storage unit 383, and the teaching position storage unit 384. The CPU 301 of the main control unit 330 functions as the dust position determination unit 381 and the switching determination unit 391 according to the program 320. The dust position storage unit 383 and the teaching position storage unit 384 are implemented by the HDD 304, for example. The joint control units 340 each include the motor control unit 385 and a switching unit 392. The CPU 351 of each joint control unit 340 functions as the motor control unit 385 and the switching unit 392 according to the program 370.

The encoders 235 and 236 are absolute encoders. The encoder control unit 362 controls the detection head 620 of the encoder 235 to obtain a signal from the detection head 620 of the encoder 235. The encoder control unit 363 controls the detection head 620 of the encoder 236 to obtain a signal from the detection head 620 of the encoder 236.

In FIG. 11, the processing of steps S1 to S5 is similar to that described in the first exemplary embodiment. The judgment processing of step S5 is performed by the switching determination unit 391.

In step S5, in a case where the switching determination unit 391 judges that the read error occurs in the non-allowable region R2 (NO in step S5), the processing proceeds to step S61. In step S61, the switching determination unit 391 switches the operation of the joints J1 to J6 of the robot arm 201 from the output control mode to the input control mode to control the operation of the joints J1 to J6 of the robot arm 201. Specifically, the switching determination unit 391 transmits a command to perform control in the input control mode to the switching unit 392 of the joint control unit 340. The motor control unit 385 then performs feedback control in the input control mode. If the joint has already been controlled in the input control mode, the input control mode is maintained.

Here, all the plurality of joints J1 to J6 may be switched to and controlled in the input control mode. In the second exemplary embodiment, only the joint that includes the encoder 236 causing the read error in the non-allowable region R2 is switched from the output control mode to the input control mode for control. Other joints continue to be controlled in the output control mode.

If the control of a joint is switched from the output control mode to the input control mode, switching to the output control mode is prohibited until maintenance is done. After the switching to the input control mode, the value of the encoder 236 is not used for control. The dust position determination unit 381 therefore does not need to determine a read error again.

It should be noted that the encoder 235 can be used only if the precision needed when the encoder 236 is used is equivalent to or lower than that when the encoder 235 is used.

As described above, according to the second exemplary embodiment, if a read error occurs in the non-allowable region R2, the operation of the robot arm 201 is not immediately stopped and the operation of the joint of the robot arm 201 is continued in the input control mode. This can further increase the operation rate of the robot apparatus 100 and further improve the production efficiency of the part W0, compared with the first exemplary embodiment.

Figure 12:
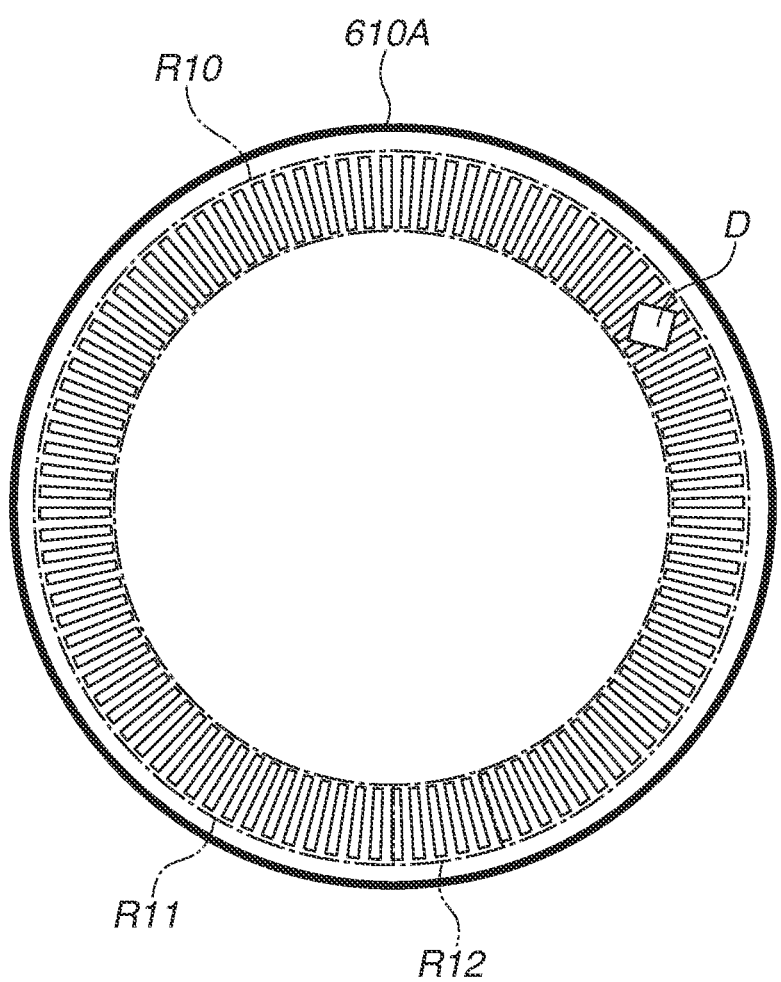
FIG. 12 is a plan view illustrating a scale of an output encoder of a robot apparatus according to a third exemplary embodiment.
Figure 13:
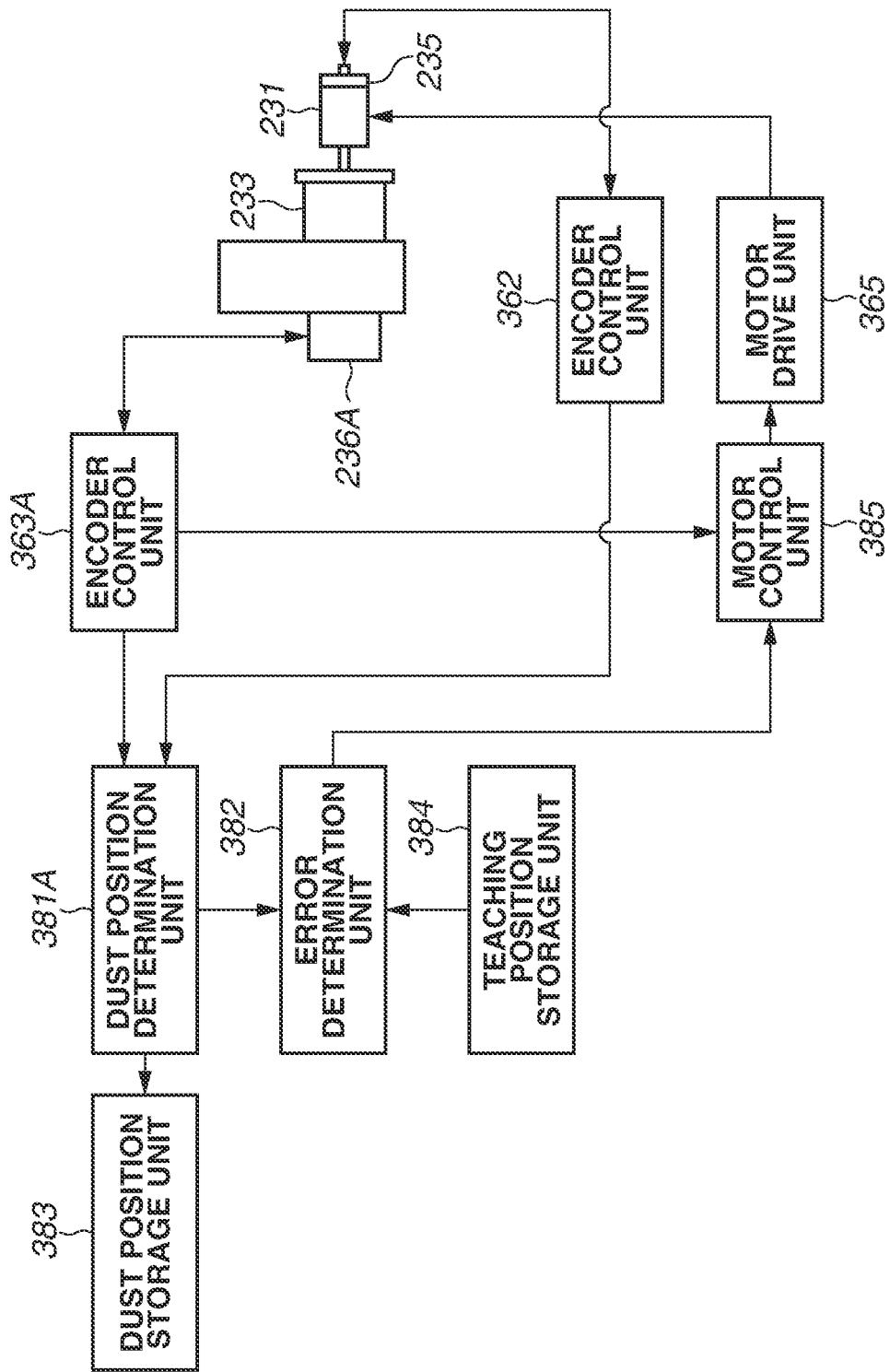
FIG. 13 is a functional block diagram illustrating a configuration of essential parts of the robot apparatus according to the third exemplary embodiment.

Next, a robot control method (method for manufacturing a part) of a robot apparatus according to a third exemplary embodiment will be described. FIG. 12 is a plan view illustrating a scale of an output encoder of the robot apparatus according to the third exemplary embodiment. FIG. 13 is a functional block diagram illustrating a configuration of essential parts of the robot apparatus according to the third exemplary embodiment. In the first and second exemplary embodiments, the encoders 236 serving as the output encoders are described to be absolute encoders. In the third exemplary embodiment, encoders 236A serving as output encoders are incremental encoders.

The encoders 236A each include a scale 610A and a detection head 620. The detection head 620 is similar to that illustrated in FIG. 3 of the first exemplary embodiment. The scale 610A includes a patterned region to be read R10. The region to be read R10 is divided between an allowable region R11 and a non-allowable region R12. Dust D can adhere to such a scale 610A.

In FIG. 13 of the third exemplary embodiment, the encoder 236A serving as an output encoder, an encoder control unit 363A thereof, and a dust position determination unit 381A are different from those in the block diagram of FIG. 6 described in the first exemplary embodiment. The rest of the configuration is similar to that of the first exemplary embodiment.

Since the encoder 236A is an incremental encoder, the encoder control unit 363A converts a pulse signal from the encoder 236A into a digital signal (serial signal). The encoder control unit 363A outputs the digital signal to the dust position determination unit 381A.

The dust position determination unit 381A performs a threshold determination on the digital signal obtained from the encoder control unit 363A to determine whether there is a read error. In a case where there is a read error, the dust position determination unit 381A identifies in which position the read error occurs on the scale 610A of the encoder 236A, by using an encoder value obtained from the encoder control unit 362.

The flow of a robot control method (method for manufacturing a part) according to the third exemplary embodiment is similar to that of FIG. 9 described in the first exemplary embodiment. A difference lies in the calculation method of step S3. Specifically, in step S3, the dust position determination unit 381A determines the position where the read error occurs based on a detection result of the encoder 235.

More specifically, the encoder 236 which is an absolute encoder can identify a position where the read error occurs from the positions before and after the position where the read error occurs. On the other hand, the encoder 236A which is an incremental encoder is not able to identify an absolute position. A position where the read error occurs is therefore difficult to identify from only the read result of the encoder 236A. In the third exemplary embodiment, in a case where a read error occurs, the dust position determination unit 381A divides the encoder value of the encoder 235 at the time of occurrence of the read error by the reduction ratio N (for example, 50) of the reduction gear 233. The dust position determination unit 381A thereby converts the encoder value of the encoder 235 into a joint angle, i.e., the value of the encoder 236A. The value thus obtained by converting the encoder value of the encoder 235 is used as the position where the read error occurs. In a case where the read error occurs in the non-allowable region R12, the operation of the joints J1 to J6 of the robot arm 201 is stopped as in the first exemplary embodiment.

As described above, even if the encoder 236A (output encoder) is an incremental encoder, the position where a read error occurs can be identified based on the encoder value of the encoder 235 (input encoder).

In the third exemplary embodiment, the encoder 235 is described to be an absolute encoder. However, the encoder 235 may be an incremental encoder.

In the third exemplary embodiment, like the first exemplary embodiment, if a read error occurs in the non-allowable region R12, the operation of the joints J1 to J6 of the robot arm 201 is stopped. However, like the second exemplary embodiment, the operation of the joint may be switched to the input control mode.

The present invention is not limited to the foregoing exemplary embodiments, and various modifications may be made without departing from the technical concept of the present invention. The effects described in the exemplary embodiments of the present invention are merely a list of most suitable effects of the present invention. The effects of the present invention are not limited to those described in the exemplary embodiments of the present invention.

An exemplary embodiment of the present invention may be implemented by processing for supplying a program for implementing one or more of the functions of the foregoing exemplary embodiments to a system or an apparatus via a network or a recording medium, and reading and executing the program by one or more processors of a computer of the system or apparatus. An exemplary embodiment of the present invention may be implemented by a circuit (for example, an application specific integrated circuit (ASIC)) that implements one or more of the functions.

In the foregoing exemplary embodiments, the robot arm 201 is described to be a vertical articulated robot arm. However, this is not restrictive. The robot arm 201 may be various types of robot arms. Examples include a horizontal articulated robot arm, a parallel link robot arm, and a Cartesian coordinate robot arm.

In the foregoing exemplary embodiments, the joints are rotary joints or swing joints, and the encoders are rotary encoders. However, this is not restrictive. If the joints are linear joints, the encoders may be linear encoders.

In the foregoing exemplary embodiments, the encoders are of reflection type. However, this is not restrictive. The encoders may be of transmission type. Specifically, the light receiving units of the detection heads may detect transmitted light from the scales.

In the foregoing exemplary embodiments, the CPU 301 of the main control unit 330 determines the presence or absence of a read error. However, this is not restrictive. The CPUs 351 of the respective joint control units 340 may determine a read error. In such a case, the CPUs 351 may transmit determination results to the CPU 301. Specifically, the CPUs 351 of the joint control units 340 may include part or all of the functions of the dust position determination unit, the error determination unit, and the switching determination unit. In such a case, the CPU 301 of the main control unit 330 and the CPUs 351 of the joint control units 340 constitute a control unit.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-025110, filed Feb. 12, 2016, which is hereby incorporated by reference herein in its entirety.

What is claimed is:

1. A robot apparatus comprising:
a robot having an encoder in a joint portion; and
a control unit configured to control an operation of the robot based on a detection result of the encoder,
wherein the encoder includes a scale having a pattern and a detection head configured to move relatively with respect to the scale and read the pattern at a position to which the detection head has moved,
wherein the pattern has an allowable region in which a read error of the detection head is tolerated and a non-allowable region other than the allowable region,
wherein the detection head includes a light source configured to irradiate the scale with light and a receiving unit configured to receive reflected light or transmitted light from the scale,
wherein the control unit performs a first process for detecting presence of the read error based on an amount of the light received by the light receiving unit, and
wherein, in a case where the read error is detected in the first process, the control unit performs a second process for determining whether the read error has occurred in the allowable region or the non-allowable region.

2. The robot apparatus according to claim 1,
wherein the robot includes a drive source configured to drive the joint, a reduction gear configured to reduce speed of output of the drive source, and an input encoder configured to detect a position of an input side of the reduction gear,
wherein the encoder is an output encoder configured to detect a position of an output side of the reduction gear, and
wherein the control unit is configured to selectively perform an input control mode in which the operation of the robot is controlled based on a detection result of the input encoder and an output control mode in which the operation of the robot is controlled based on the detection result of the output encoder.

3. The robot apparatus according to claim 2, wherein the control unit is configured to, in a case it is determined that the read error has occurred in the non-allowable region, control the operation of the robot in the input control mode.

4. The robot apparatus according to claim 2,
wherein the output encoder is an incremental encoder, and
wherein the control unit obtains a position where the read error has been detected based on the detection result of the input encoder.

5. The robot apparatus according to claim 1,
wherein the encoder is an absolute encoder, and
wherein the control unit identifies, in the second process, the position where the read error has been detected based on two pieces of position information about a position where the read error has not been detected.

6. The robot apparatus according to claim 1, further comprising a storage unit configured to store teaching point data to be used to control the operation of the robot,
wherein the control unit is configured to calculate trajectory data on the robot from the teaching point data and to control the operation of the robot according to the calculated trajectory data, and
wherein the non-allowable region is set so as to include a position corresponding to the teaching point data on the scale.

7. The robot apparatus according to claim 1, further comprising a notification unit configured to issue a notification that the control unit has detected the read error,
wherein the control unit is configured to, in a case where the read error is detected to be present, cause the notification unit to issue the notification.

8. The robot apparatus according to claim 1, wherein the control unit changes a position of the allowable region and a position of the non-allowable region.

9. The robot apparatus according to claim 1, wherein the control unit continues the operation of the robot in a case where the read error is not detected in the first process.

10. The robot apparatus according to claim 1, wherein the control unit continues the operation of the robot in a case where it is determined, in the second process, that the read error has occurred in the allowable region.

11. The robot apparatus according to claim 1, wherein the control unit stops the operation of the robot in a case where it is determined, in the second process, that the read error has occurred in the non-allowable region.

12. A robot control method by which a control unit controls an operation of a robot having an encoder in a joint portion based on a detection result of the encoder,
wherein the encoder includes a scale having a pattern and a detection head configured to move relatively with respect to the scale and read the pattern at a position to which the detection head has moved,
wherein the detection head includes a light source configured to irradiate the scale with light and a receiving unit configured to receive reflected light or transmitted light from the scale,
wherein the pattern has an allowable region in which a read error of the detection head is tolerated and a non-allowable region other than the allowable region, and
wherein the robot control method comprises:
a first process in which the control unit detects presence of the read error based on an amount of the light received by the light receiving unit; and
a second process in which the control unit determines whether the read error has occurred in the allowable region or the non-allowable region in a case where the read error is detected in the first process.

13. A non-transitory computer-readable recording medium that stores a program for causing a computer to execute a robot control method by which a control unit controls an operation of a robot,
wherein the robot has an encoder in a joint portion, and the control unit is configured to control an operation of the robot based on a detection result of the encoder,
wherein the encoder includes a scale having a pattern and a detection head configured to move relatively with respect to the scale and read the pattern at a position to which the detection head has moved,
wherein the detection head includes a light source configured to irradiate the scale with light and a receiving unit configured to receive reflected light or transmitted light from the scale,
wherein the pattern has an allowable region in which a read error of the detection head is tolerated and a non-allowable region other than the allowable region, and
wherein the robot control method comprises:
a first process in which the control unit detects presence of the read error based on an amount of the light received by the light receiving unit; and a second process in which the control unit determines whether the read error has occurred in the allowable region or the non-allowable region in a case where the read error is detected in the first process.

14. A part manufacturing method, by which a control unit controls an operation of a robot having an encoder in a joint portion based on a detection result of the encoder to manufacture a part,
- wherein the control unit is configured to control an operation of the robot based on a detection result of the encoder,
- wherein the encoder includes a scale having a pattern and a detection head configured to move relatively with respect to the scale and read the pattern at a position to which the detection head has moved,
- wherein the detection head includes a light source configured to irradiate the scale with light and a receiving unit configured to receive reflected light or transmitted light from the scale,
- wherein the pattern has an allowable region in which a read error of the detection head is tolerated and a non-allowable region other than the allowable region, and
- wherein the part manufacturing method comprises:
- a first process in which the control unit detects presence of the read error based on an amount of the light received by the light receiving unit; and
- a second process in which the control unit determines whether the read error has occurred in the allowable region or the non-allowable region in a case where the read error is detected in the first process.

* * * * *